May 6, 1952     P. R. VOGT ET AL     2,595,618
TWO PUMP SYSTEM
Filed July 25, 1947
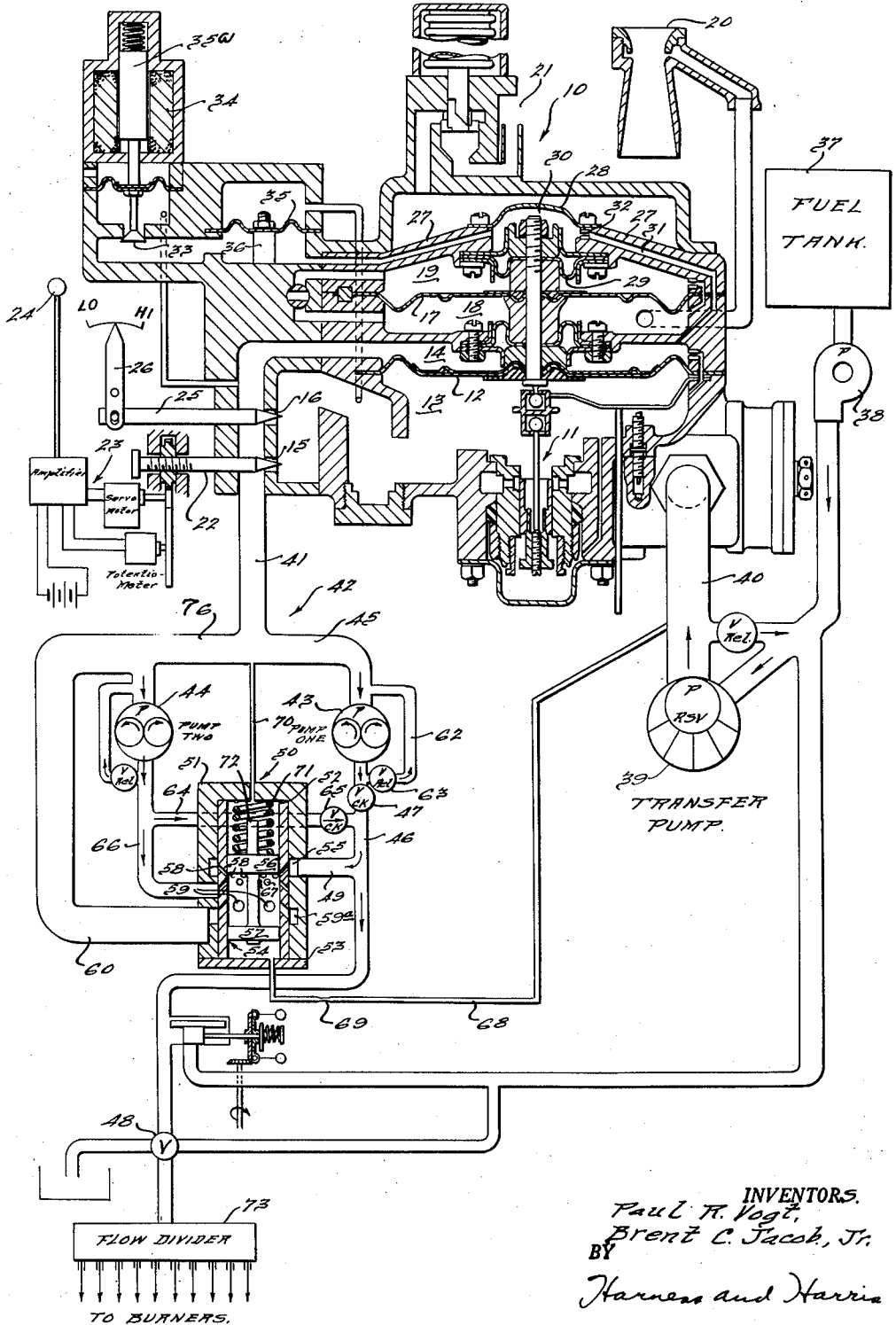
INVENTORS.
Paul R. Vogt,
Brent C. Jacob, Jr.
BY
Harness and Harris
ATTORNEYS.

Patented May 6, 1952

2,595,618

UNITED STATES PATENT OFFICE 2,595,618

TWO PUMP SYSTEM

Paul R. Vogt, Grosse Pointe, and Brent C. Jacob, Jr., Detroit, Mich., assignors to Chrysler Corporation, Highland Park, Mich., a corporation of Delaware Application July 25, 1947, Serial No. 763,510

13 Claims. (Cl. 103—11)

An object of the present invention is to provide a control for the operation of a system comprising two pumps, in which one pump is normally used and the other pump serves as a stand-by for use during failure of the one pump. This two-pump control may be used for supplying a liquid fuel to burners driving a gas turbine.

Another object is to operate the aforesaid two-pump control in conjunction with a metering device whereby adjustment is effected by means of the pressure drop due to metering across the metering device.

Other objects will appear from the disclosure.

Reference character 10 designates a fuel-metering device, which will be described only briefly in the present application, since it forms per se no part of the present invention. For a more specific description of the device, attention is directed to the copending application of Vogt and Nims, Serial No. 763,576, filing date July 25, 1947. The metering device 10 includes a regulating valve 11 controlled by a fuel diaphragm 12 responsive to unmetered fuel pressure in chamber 13 and metered fuel pressure in chamber 14 as determined by the pressure drop across metering orifices 15 and 16, and by air diaphragm 17 responsive to air pressures existing in chambers 18 and 19 and transmitted thereto by pressure-sensing elements 20 and 21 placed in an air path leading to a combustion device to which fuel applied by the device 10 is also delivered. The size of the metering orifice 15 is controlled by a needle valve 22 regulated by an electrical means 23 responsive to an element 24 sensitive to the temperature in the aforementioned air path. The orifice 16 is controlled by a needle valve 25 through an indicator 26, which is manually adjustable. The metering device 10 has bridge portions 27 which carry a cap 28 and a diaphragm 29 and form therewith a chamber for fuel 30, which is connected with the metered fuel chamber 14 through a passage 31 having a restriction 32. When a valve 33 controlled by a solenoid 34 is closed as shown, fuel may exit from the chamber 30 only by way of the restriction 32, and thus responsiveness of the regulating valve 11 to changes in air-flow rate as imposed upon the air diaphragm 17 is slowed, and changes in air-flow rate of short duration have no effect upon the regulating valve 11 and therefore, upon the fuel-flow rate. When there is a large reduction in air-flow rate, the compression of the fuel in the chamber 30 will be sufficient to raise a diaphragm 35, thereby providing for an immediate reduction in fuel-flow rate. If the air-flow rate is greatly increased, there is no corresponding immediate increase in fuel-flow rate, for a part 36 secured to the diaphragm 35 prevents downward movement of the diaphragm. When a device or machine driven by the fuel delivered by the metering device 10 is not operating in the desired speed range, the solenoid 34 is energized by means, not shown, to depress a plunger 35a formed as an extension of the valve 33 and to open the valve 33. Under these conditions unrestricted entry and escape of fuel with respect to the chamber 30 may take place by way of the open valve 33, and the regulating valve 11 is immediately responsive to changes in air-flow rate. Fuel is supplied from a tank 37 to a booster pump 38, thence to a transfer pump 39, and thence through a conduit 40 to the metering device. Fuel leaves the metering device 10 by way of a conduit 41. The above described details of the metering device 10 are important to a two-pump system 42, about to be described, to the extent that the two-pump system is controlled by the difference between the pressure of fuel as received by the metering device through the conduit 40 and the pressure of fuel as delivered by the metering device in the line 41. These pressures are different because of pressure losses in the regulating valve 11 and the metering orifices 15 and 16.

The two-pump fuel system 42 comprises essentially a pump 43 which is adapted normally to deliver the fuel from the metering device 10 to a combustion device, not shown, and a pump 44, which is normally adapted merely to by-pass and to deliver fuel to the combustion device only in the event of failure or unsatisfactory operation of pump 43. Line 41 splits into lines 45 and 76 leading respectively to pumps 43 and 44. A discharge line 46 containing a check valve 47 leads from the pump 43 to a valve 48. A bypass line 49 leads from the discharge line 46 to a valve 50 formed of a body 51, a sleeve 52 positioned therein, a cover 53, and a balanced piston valve 54 slidable in the sleeve 52. The bypass line 49 leads directly to an annular recess 55 formed in the body 51 about the sleeve 52. The annular recess communicates with the space between sections 56 and 57 of the piston valve 54 by way of passages 58 formed in the sleeve 52. Passages 59 formed in the valve sleeve 52 connect the space between the piston sections 56 and 57 with an annular recess 59a formed in the valve body 51 about the sleeve 52. A combined bypass 60 leads from the annular recess 59a to the line 46, thereby being connected with the intake sides of the pumps 43 and 44. A relief line 62 for the pump 43 connects the intake and discharge lines 45 and 46 and carries a relief valve 63. The pump 44 has a discharge line 64 leading through a check valve 65 to the discharge line 46 for the pump 43. A bypass line 66 leads from the discharge line 64 to the valve 51 and is connected through passages 67 in the valve sleeve 52 with the space between the piston sections 56 and 57. A line 68 connects the receiving line 40 for the fuel-metering device 10 with the space in the valve sleeve 52 below the piston section 57, thereby subjecting the lower end of the piston valve 54 to the receiving pressure of the metering device 10. A restriction 69 in the line 68 dampens any fluctuations in the receiving pressure. The upper end of the piston valve 54 is subjected to the delivery pressure of the fuel-metering device 10 by way of a line 70 leading from the line 41 to the control valve 50. A coil spring 71 acts between the valve body 51 and the upper end of the piston valve 54 to urge the piston valve 54 downwardly and thereby to provide a compensation for the difference in fuel pressures existing in the lines 68 and 70. The coil spring 71 is presumed to act with relatively constant force during its various stages of compression, which will not vary materially, since movement of the valve 56 will be small, as will be described hereinafter. A rod extension 72 on the upper end of the piston valve 54 limits upward movement of the piston valve in the sleeve 52.

It will be observed that the section 56 of the piston valve 54 in the position shown in the drawing, partially blocks the openings 58 in the valve sleeve 52. Thereby a portion of the discharge of the pump 43 passes from the discharge line 46 through the bypass line 49 and through the valve 50 to the joint bypass 60. The rest of the discharge of the pump goes by way of the line 46 to the valve 48 and thence to a fuel divider 73. If the pressure in the delivery line 41 of the fuel-metering device 10 falls, and the pressure in the receiving line 40 remains relatively constant as is usually the case, then the pressure difference acting on the piston valve 54 causes it to move upwards from the position shown, thereby providing less restriction to the openings 58 in the valve sleeves 52 connected with the bypass line 49 for pump 43, and more fuel is bypassed to the line 41. This action reduces the pressure difference requisite for the coil spring 71 to stop movement of the piston valve 54 with respect to the sleeve 52. If the pressure in the delivery line 41 of the fuel-metering device 10 becomes too high, the fuel pressure acting on the piston valve 54 is reduced, to the point where the force of the spring 71 is greater than the upward force exerted by the fuel pressure difference, and the piston valve 54 moves downwards to increase the restriction of the openings 58 in the valve sleeve 52. When this happens, less of the discharge of the pump 43 is bypassed, and the pressure in the conduit 41 is reduced to restore the necessary pressure difference between the lines 40 and 41 to halt movement of the piston valve 54. During this time the entire discharge of pump 44 is bypassed, for the sleeve valve openings 67 for the bypass line 66 of the pump 44 are unrestricted, and discharge of pump 44 cannot flow rightwards in the discharge line 64 beyond the check valve 65 against the equal or greater pressure existing in the discharge line for the pump 43. If the pump 43 operates unsatisfactorily, the pressure in the delivery line 41 of the fuel-metering device 10 rises considerably causing the piston valve 54 to be lowered to the point where the section 56 completely blocks openings 58 in the valve sleeve 52 and at least partially blocks the openings 67. Thus the amount of bypass by the pump 44 through the line 66 is reduced and fuel is delivered by the pump 44 through the discharge line 64 past a check valve 65 into the discharge line 46 for the pump 43, through which it passes to the valve 48 and the flow divider 73. This action reduces the pressure in the line 41 sufficiently to stop downward movement of the piston valve 54. If pump 43 again functions properly, pressure in the line 41 will be sufficiently lowered to cause the piston valve 54 to rise until the output of pump 44 is entirely bypassed by virtue of complete uncovering of the sleeve valve openings 67, and a portion of the output of pump 43 may be bypassed by partial uncovering of the sleeve valve openings 58.

We claim:

1. In combination, first and second pumps having intake and discharge sides, bypasses connecting the intake and discharge sides and having a common portion, and valving incorporated in the common portion comprising valve structure operably shiftable to block the bypasses contemporaneously and being adjustable so as to restrict or block the bypass of the first pump while leaving free the bypass of the second pump and to restrict or block the bypass of the second pump while blocking the bypass of the first pump.

2. In combination, first and second pumps having intake and discharge sides, bypasses connecting the intake and discharge sides and having a common portion, a valve adjustable with respect to the common portion so as to restrict or block the bypass of the first pump while leaving free the bypass of the second pump and to restrict or block the bypass of the second pump while blocking the bypass of the first pump, and means responsive to intake pressure of the pumps for adjusting the valve.

3. In combination, first and second pumps having intake and discharge sides, bypasses for tne pumps connecting the discharge and intake sides thereof, a control valve associated with the bypasses so as to restrict or block the bypass of the first pump while leaving free the bypass of the second pump and to restrict or block the bypass of the second pump while blocking the bypass of the first pump, a first discharge line connected with the discharge side of the first pump, a second discharge line connecting the discharge side of the second pump and the first discharge line, a first check valve in the first discharge line between the first pump and the connection of the first and second discharge lines for preventing discharge from the second pump from reaching the first pump, and a second check valve in the second discharge line for preventing discharge from the first pump from reaching the bypass for the second pump.

4. In combination, first and second pumps having intake and discharge sides, a control valve comprising an inner balanced reciprocal valve part and an outer valve part surrounding the inner valve part and having first, second, and third openings, the first and second openings being along the line of reciprocation of the inner valve part, a bypass for the first pump comprising a first conduit means leading from the discharge side of the first pump to the first opening in the outer valve part and a second conduit means leading from the third opening in the outer valve part to the intake sides of the first and second pumps, and a bypass for the second pump comprising the second conduit means and a third conduit means leading from the discharge side of the second pump to the second opening in the outer valve part, whereby the inner valve part may partly or completely cover the first opening in the outer valve part to restrict or block the bypass of the first pump while uncovering the second opening in the outer valve part to leave free the bypass of the second pump and may also partly or completely cover the second opening to restrict or block the bypass for the second pump while completely covering the first opening to block the bypass of the first pump.

5. The combination specified in claim 4 and further comprising a first discharge line connected with the discharge side of the first pump, a second discharge line connecting the discharge side of the second pump and the first discharge line, a first check valve in the first discharge line between the first pump and the connection of the first and second discharge lines for preventing discharge from the second pump from reaching the first pump, and a second check valve in the second discharge line for preventing discharge from the first pump from being bypassed by way of the third conduit means.

6. The combination with a liquid-metering device adapted to receive liquid at one pressure and to deliver it at another lower pressure due to pressure loss in metering, of first and second pumps having intake and discharge sides, means connecting the delivery side of the device with the intake sides of the pumps, a control valve comprising an inner balanced reciprocal valve part and an outer valve part surrounding the inner valve part and having first, second, and third openings spaced in that order in the direction of reciprocation of the inner valve part, a bypass for the first pump comprising a first conduit means leading from the discharge side of the first pump to the first opening in the outer valve part and a second conduit means leading from the third opening in the outer valve part to the intake sides of the first and second pumps, a bypass for the second pump comprising the second conduit means and a third conduit means leading from the discharge side of the second pump to the second opening in the outer valve part, whereby the inner valve part may partly or completely cover the first opening in the outer valve part to restrict or block the bypass of the first pump while uncovering the second opening in the outer valve part to leave free the bypass of the second pump and may also partly or completely cover the second opening to restrict or block the bypass for the second pump while completely covering the first opening to block the bypass of the first pump, and means for transmitting to opposite sides of the inner valve part the receiving and delivery pressures of the liquid-metering device for adjusting the inner valve part with respect to the outer valve part to maintain a relatively constant difference between receiving and delivery pressures of the liquid-metering device.

7. In combination, first and second pumps having intake and discharge sides, bypasses connecting the intake and discharge sides and having separate portions and a common portion into which said separate portions commonly merge, and a valve in the common portion cooperatively adjacent the location of merger of the separate portions therewith and adjustable to restrict or block the bypass of the first pump and then progressively to begin restricting or blocking the bypass also of the second pump.

8. In combination, first and second pumps having intake and discharge sides, bypasses connecting the intake and discharge sides and having separate portions and a common portion into which said separate portions commonly merge, valving in the common portion susceptive to appropriate shifting effects to block the bypasses, and means effective to shift the valving into positions appropriate to restrict or block only the bypass of the first pump and appropriate to block the bypass of the first pump and restrict or block as well the bypass of the second pump.

9. In combination, first and second pumps having intake and common discharge sides, valving structure comprising positionable valve parts, bypass conduit connecting the valving structure with the intakes, conduit structure associated with parts of the valving structure adapted to return to the latter for bypass, a portion of pump output from the common discharge side, conduit structure associated with parts of the valving structure adapted to return to the latter for bypass a portion of pump output, and positioning means to position said valve parts for obstructing the conduit structures.

10. In combination, first and second pumps having intake and common discharge sides, valving structure comprising positionable valve parts, bypass conduit connecting the valving structure with the intakes, conduit structure associated with parts of the valving structure adapted to return to the latter for bypass, a portion of pump output from the common discharge side, conduit structure associated with parts of the valving structure adapted to return to the latter for bypass a portion of pump output, and positioning means to position said valve parts for obstructing one of said conduit structures and for partially restricting the other conduit structure or for restricting only a certain conduit structure.

11. In combination, first and second pumps having intake and individual and common discharge sides, valving structure comprising positionable valve parts, bypass conduit connecting the valving structure with the intakes, means associated with parts of the valving structure adapted to establish communication between the latter and the common discharge side, means associated with parts of the valving structure adapted to provide communication between the latter and the individual discharge of a certain pump, and positioning means to position said valve parts for obstructing a certain one or both said associated means.

12. In combination, first and second pumps having intake and individual and common discharge sides, valving structure comprising positionable valve parts, bypass conduit connecting the valving structure with the intakes, means associated with parts of the valving structure adapted to establish communication between the latter and the common discharge side, means associated with parts of the valving structure adapted to provide communication between the latter and the individual discharge of a certain pump, and positioning means to position said valve parts for obstructing wholly or in part said communication establishing means alone or said communication providing means wholly or in part and said communication means establishing means wholly.

13. In combination, first and second pumps having intake and individual and common discharge sides, valving structure comprising positionable valve parts, bypass conduit connecting the valving structure with the intakes, means associated with parts of the valving structure adapted to establish communication between the latter and the common discharge side, means associated with parts of the valving structure adapted to provide communication between the latter and the individual discharge of a certain pump, and positioning means to position said valve parts for adjustably restricting said associated communication establishing means alone or for generally obstructing a certain of said associated means and adjustably restricting the other of said associated means.

PAUL R. VOGT.
BRENT C. JACOB, JR.

REFERENCES CITED

The following references are of record in the file of this patent:

UNITED STATES PATENTS

| Number | Name | Date |
|---|---|---|
| 1,658,307 | Small | Feb. 7, 1928 |
| 2,432,502 | Bentley et al. | Dec. 16, 1947 |